United States Patent Office 3,755,463
Patented Aug. 28, 1973

3,755,463
PROCESS FOR THE PREPARATION OF
HYDROXYALKYL MERCAPTANS
Wilfried Umbach, Langenfeld Rhineland, Rainer Mehren, Wesel-Lackhausen, and Werner Stein, Erkrath-Unterbach, Germany, assignors to Henkel & Cie G.m.b.H., Dusseldorf, Germany
No Drawing. Continuation-in-part of application Ser. No. 818,444, Apr. 22, 1969. This application Oct. 6, 1971, Ser. No. 187,191
Claims priority, application Germany, Apr. 23, 1968, P 17 68 265.4
Int. Cl. C07c 149/14
U.S. Cl. 260—609 R   6 Claims

ABSTRACT OF THE DISCLOSURE

Reacting hydrogen sulfide with mono or poly, terminal or non-terminal, aliphatic or cycloaliphatic epoxide at a temperature of from —20° C. to 150° C. in the presence of 0.01 to 10% by weight, based on the epoxide, of an aliphatic, cycloaliphatic, aromatic and/or heterocyclic, primary or secondary amines, to produce a higher molecular weight hydroxyalkyl mercaptan.

REFERENCE TO A PRIOR APPLICATION

This application is a continuation-in-part of our copending application Ser. No. 818,444, filed Apr. 22, 1969, now abandoned.

THE PRIOR ART

The previously known, technically utilizable processes for the preparation of hydroxyalkyl mercaptans, are based for the most part on the reaction of alkylene oxides with hydrogen sulfide in the gaseous phase over suitable catalysts, for example basic ion exchangers, and remain substantially restricted in their field of application to the reaction of low boiling epoxides.

A possible method for carrying out the reaction in the liquid phase is described in German patent specification No. 1,221,217. According to this, the epoxide is reacted with hydrogen sulfide in a solvent which has a higher boiling point than the hydroxyalkylmercaptan to be prepared, and the reaction product is separated by distillation from the reaction mixture before its concentration therein exceeds 20% by weight. Such a method is relatively expensive and troublesome.

A further known possible method for the preparation of hydroxyalkyl mercaptans consists in the reaction of epoxides with hydrogen sulfide in suitable solvents. The reaction is carried out by reacting at least the stoichiometric amount of strong bases, such as alkali metal and alkaline earth metal hydroxides, or alkali metal alcoholates, in a mostly water-free solvent with hydrogen sulfide, and then reacting the epoxide with the hydrogen sulfide solution obtained. Apart from the fact that such a method, which does not directly use hydrogen sulfide, is troublesome for a preparation on a larger scale and long reaction times and stoichiometric amounts of bases are necessary, also only moderate yields of hydroxyalkyl mercaptans are obtained. The best yields were obtained by the method of Culvenor (J. Chem. Soc., 1949, 278) by reacting epoxides with potassium hydrogen sulfide in alcohol; for example for the reaction of cyclohexene oxide, a yield of 44% of 2-hydroxycyclohexylmercaptan is obtained.

It has also been suggested to react higher molecular weight alkene oxides with hydrogen sulfide at normal pressures in the presence of large amounts of trialkylamine, as both solvent and catalyst. However, here again only moderate yields are obtained, and recovery of the excess trialkylamine is required for economy of operation.

Therefore, according to the previous state of the art, it was not possible to prepare hydroxyalkyl mercaptans, especially higher hydroxyalkyl mercaptans, in good yields with, at the same time, an economically allowable expenditure.

OBJECTS OF THE INVENTION

An object of the present invention is the development of a process for the preparation of hydroxyalkyl mercaptans in high yields.

Another object of this invention is the discovery of a process for the preparation of hydroxyalkyl mercaptans by reacting in liquid phase an epoxide with hydrogen sulfide at a temperature of from —20° C. to 150° C. in the presence of 0.01% to 10% by weight of a primary or secondary amine, based on the epoxide.

DESCRIPTION OF THE INVENTION

The present invention relates to the process for preparing hydroxyalkyl mercaptans having more than 3 carbon atoms.

The process of the preparation of hydroxyalkyl mercaptans containing more than 3 carbon atoms involves the reaction between a corresponding epoxide and substantially equimolar amount of hydrogen sulfide at a temperature of from —20° C. to 150° C., preferably 0° C. to 80° C., in the presence of 0.01 to 10% by weight of a primary or secondary amine, based on the amount of the epoxide employed. The reaction of the epoxides with hydrogen sulfide is preferably carried out under normal pressure on substantially equimolar basis. Depending on the reactants and the reaction conditions, the reaction can be conducted under elevated pressures, if necessary. The primary or secondary amine may be mixed with the epoxide and the reaction mixture is heated to the reaction temperature, at which time continuous introduction of hydrogen sulfide to the reaction mixture is commenced. It is desirable to maintain the mixture at the reaction temperature throughout the reaction period. This can be achieved by controlling the rate of addition of hydrogen sulfide. Generally, hydrogen sulfide is added to the mixture while agitating same in an amount that the reaction mixture can absorb. The end of the reaction is apparent when evolution of the reaction heat subsides, and is completed when the mixture does not absorb any more of hydrogen sulfide. The duration of the reaction is up to several hours, and more specifically, is from 2 to 3 hours. During the reaction, the temperature must be carefully controlled since the yield of hydroxyalkyl mercaptans will be affected if the temperature is permitted to rise above about 150° C.

Monoepoxy and polyepoxy terminal or non-terminal aliphatic epoxides can be used in the invention as starting materials. The aliphatic epoxides can be straight or branched chains, or may be interrupted or substituted in the alkyl chains by hetero atoms or by hetero atom groups. Moreover, monoepoxy or multiepoxy, substituted or unsubstituted cycloaliphatic epoxides can be used. Also, mixtures of various epoxides can be utilized, as well as mixtures, which have, in addition to epoxy groups, additional functional groups which are inert to hydrogen sulfide. Such mixtures can be, for instance, epoxized cracked olefins, in which in addition to various epoxides, paraffins and non-reacted olefins can be present; furthermore, epoxized fatty acid and the fatty alcohol mixtures, which can be obtained from natural unsaturated fats and oils.

Preferably, epoxides with 8 to 24 carbon atoms, or the corresponding mixtures are utilized. These epoxides are alkene-vic.-oxides having 8 to 24 carbon atoms, for example, n-octene-oxide-1,2; n-tetracosene-oxide-1,2; 2-ethylhexene-oxide-1,2; n-octene-oxide-2,3; etc.; alkadiene-divic.-oxides having 8 to 24 carbon atoms, for example, n-octadiene-dioxide-1,2-7,8; etc.; lower alkyl esters of vic.-epoxy-alkanoic acids having from 8 to 24 carbon atoms, for example, methyl 9,10-epoxy-octadecanoate, etc.; alkoxy-alkene-vic.-oxides having from 8 to 24 carbon atoms, for example, 2-ethylhexyl - glycidyl - ether, etc.; hydroxyalkene-vic.-oxides having from 8 to 24 carbon atoms, for example, 2,3-epoxyoctanol-4, etc.; and cycloalkene-vic.-oxides having from 8 to 24 carbon atoms, for example, cyclododecene-vic.-oxide.

Preferably, the epoxide starting materials are monoepoxides of the formula

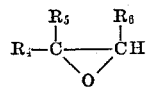

wherein $R_4$ is a member selected from the group consisting of hydrogen, alkyl having from 1 to 22 carbon atoms, alkylol having from 1 to 22 carbon atoms, alkoxyalkyl having from 2 to 22 carbon atoms, clycloalkylalkyl having from 6 to 22 carbon atoms and alkenyl having from 3 to 22 carbon atoms, $R_5$ and $R_6$ are members selected from the group consisting of $R_1$, and when taken together, alkylene having from 3 to 4 carbon atoms, with the proviso that at least one of $R_4$, $R_5$ and $R_6$ is other than hydrogen, and that the sum of the carbon atoms in $R_4$, $R_5$ and $R_6$ is from 6 to 22.

Starting epoxide materials may be prepared by epoxidization of the corresponding olefinically unsaturated compounds with peracetic acid, for instance.

To catalyze the reaction of the invention, from 0.01% to 10% by weight based on the epoxide, and preferably from 0.05 to 7% by weight, of a primary or secondary amine is used. Suitable amines are selected from the group consisting of aliphatic, cycloaliphatic, aromatic and/or heterocyclic primary or secondary amines. Heterocyclic amines include ring structures containing one nitrogen atom, two nitrogen atoms and a nitrogen atom and an oxygen atom, in addition to carbon atoms. The amines are selected from monovalent and multivalent primary and secondary amines. Examples of suitable amines are alkylamines and dialkylamines having from 1 to 6 carbon atoms in the alkyl such as methylamine, diethylamine, n-butylamine, etc.; cycloalkylamines and alkyl-cycloalkylamines having from 5 to 6 carbon atoms in the cycloalkyl and 1 to 6 carbon atoms in the alkyl such as cyclohexylamine and methyl-cyclohexylamine; alkylene diamines and polyalkylenepolyamines having 2 to 4 carbon atoms in the alkylene and 3 to 5 nitrogen atoms in the polyamine such as ethylene diamine, diethylenetriamine, triethylenetetraamine, etc.; and unsubstituted heterocyclic secondary amines, preferably those having 5 to 6 atoms in the ring such as piperidine and morpholine.

No solvent is necessary in order to effect the reaction although, it sometimes may be advantageous, as in the case of a highly viscous reaction mixture, to add inert organic solvents. Appropriate solvents are, above all, polar substances, for instance alcohols such as methanol, ethanol, propanol; ethers, such as diethylether, dioxane; as well as various ethylene glycol ether types known by their commercial name of Cellosolve. Also suitable are dimethylformamide, and dimethylsulfoxide. The choice of the solvent in each case is made from the point of view of its easy separation from the reaction product. The amount of solvent that can be used can vary to a large extent, and may be, for example, from 50% to 150% by weight based on the amount of epoxide employed.

When solvent is used in the reaction, the process may be altered by mixing the primary or secondary amine with the solvent and adding the epoxide dropwise while simultaneously introducing hydrogen sulfide into the reaction mixture.

Upon completion of the reaction, the products are recovered and purified in a conventional manner. This may be achieved by distillation, after neutralizing the basic catalyst with dilute acid, and separation of the aqueous and the organic phases. The organic phase is fractionated to obtain a refined product.

Since the reaction between higher molecular weight epoxides and hydrogen sulfide results in water-insoluble products, these products can be recovered by introducing the reaction mixture into ice water and purifying the insoluble phase by recrystallization.

The higher molecular weight hydroxyalkyl mercaptans described herein are obtained in high yields and in a very pure form. They can be used in the control of pests as insecticides and fungicides. They are effective antioxidates for rubber formulations. They can be used, furthermore, as emulsifiers. They are valuable starting materials for numerous syntheses, on the basis of their polyfunctionality. Of particular interest are their transester and transether products which, according to the selection of the reaction partner, may be employed in the field of washing and textile treatment, as prewashing and dispersing agents, and as plasticizers in the plastics industry, or as addition to lubricant oils and lubricant materials.

The following specific examples are illustrative of the invention and are not to be construed as being in any way limitative thereof.

Example 1a

A solution of 0.046 gm. (0.1% by weight) diethylamine in 80 ml. of methanol was saturated with hydrogen sulfide at a temperature of 51° C. Subsequently, within a period of 45 minutes, 46.1 gm. (0.25 mol) of n-dodecen-oxide-1,2 was added dropwise. The reaction was maintained at 50–52° C. Hydrogen sulfide was continuously introduced into the reaction mixture in an amount that the reaction mixture was capable of absorbing. The addition of hydrogen sulfide was controlled by means of a bubble counter. After adding the epoxide, the reaction mixture continued to absorb hydrogen sulfide for another hour, a temperature of 50–52° C. being maintained. Subsequently, the amine catalyst was neutralized with dilute sulfuric acid. After adding ether, the aqueous phase was separated, and the organic phase was refined by means of fractional distillation. The yield of the product was 80% of the theory, based on the epoxide. A fraction with refractive index of $n_D^{25}=1.4712$, boiling at 112–113° C./0.01 mm. Hg was obtained. Analysis data for the product corresponds with the values computed for 2-hydroxydodecyl mercaptan. The constitution adopted was confirmed by the nuclear resonance spectrum.

The analysis data was as follows: Computed (percent): C, 65.99; H, 12.00; O, 7.33; S, 14.68. Found (percent): C, 65.95; H, 12.25; O, 7.60; S, 14.55. OH-Number (—OH and SH) Computed: 513.6. Found: 506.0.

The osmometric molecular weight determination in acetone, i.e., 219.3, was in agreement with the calculated value of 218.4.

Comparison Example 1b 46.1 gm. (0.25 mol) of n-dodecene oxide-1,2 were reacted at 45° C. with hydrogen sulfide in a solution of 0.46 gm. (1% by weight, relative to the epoxide) of triethylamine in 80 ml. of methanol. The reaction time was 3 hours. Subsequently, the catalyst was neutralized with dilute sulfuric acid, the aqueous phase separated after addition of ether, and the organic phase worked up by distillation. The first distillate contained still unreacted epoxide. After fractionate distillation from the first distillate 32.5 gm. (60% of theory) 2-hydroxydodecylmercaptan could be obtained. The refraction index of the product was $n_D^{25}=1.4712$.

These data demonstrate that even with a tenfold increase in the amount of triethylamine over the amount of diethylamine, yields of only 60% are obtained versus yields of 80% utilizing 1/10 the amount of diethylamine with a decrease in the reaction time of almost 50%.

Example 2

In a test analogous to Example 1, 46.1 gm. (0.25 mol) n-dodecenoxide-1,2 in a solution of 0.46 gm. (1 weight percent) of n-butylamine and 80 ml. metanol, was reacted with hydrogen sulfide. The addition of epoxide took 60 minutes, the total reaction period amounted to 2 hours. After purifying the product according to Example 1, 38 gm. (70% of theory) 2-hydroxydodecyl mercaptan was obtained. The refractive index of the product was $n_D^{25} = 1.4714$.

Example 3

Example 2 was repeated with the exception that instead of n-butylamine, 0.46 gm. (1 weight percent) triethylenetetraamine was used. The yield of 2-hydroxydodecyl mercaptan amounted to 68% of the theory; the refraction index of the product was $n_D^{25} = 1.4713$.

Example 4

A solution of 0.46 gm. (0.7 weight percent) diethyl amine in 85 ml. methanol was saturated at 45° C. with hydrogen sulfide. Subsequently, within a period of 1 hour, 67.1 gm. (0.25 mol) n-octadecenoxide-1,2 were added by a heated dropping funnel. While the epoxide was added, hydrogen sulfide was also introduced in proportion to its acceptance by the reaction mixtures. After the addition of the epoxide, the reaction mixture absorbed hydrogen sulfide for additional 2 hours while the temperature was maintained at 45° C. After refining the reaction mixture according to Example 1, 2-hydroxy-octadecyl mercaptan, having a melting point of 52°–57° C., with a yield of 69% of the theory, was obtained. After being twice recrystallized from petroleum ether (B.P. 60–95° C.) the product had a melting point of 56–58° C., and gave the following analysis data:

Computed (percent): C, 71.45; H, 12.66; S, 10.60. Found (percent): C, 71.46; H, 13.00; S, 10.35.

The osmometric molecular weight determination in acetone, i.e., 295.9, was in very good agreement with the calculated value of 302.6.

Example 5

100 ml. methanol were treated with 0.77 gm. (1 weight percent based on the epoxide) of piperidine, and the solution was saturated at 45° C. with hydrogen sulfide. Subsequently, within 1 hour and at this temperature, 76.9 gm. (0.6 mol) n-octenoxide- 1,2 were added dropwise, while simultaneously introducing sulfide to the degree that it was dissolved in the reaction mixture. After the addition of the epoxide was completed, the reaction mixture accepted hydrogen sulfide for 2 additional hours while maintaining it at a temperature of 45° C. The refining of the reaction mixture was effected according to Example 1. The yields of 2-hydroxyoctyl mercaptan amounted to 60% of the theory, based on the epoxide employed. The productt had a boiling point at 76° C./0.05 mm. Hg and gave the following analysis data:

Computed (percent): C, 59.20; H, 11.18; S, 19.76. Found (percent): C, 59.65; H, 11.31; S, 1919.

The advantages attainable with the invention are especially that the hydroxyalkyl mercaptans have been made available in a pure form, in high yields by a process which may be economically operated. A further advantage of the invention is that higher epoxides can be reacted with hydrogen sulfide in the process according to the invention without special expenditure on apparatus and with a high degree of reaction with at the same time a relatively short period of reaction. Higher hydroxyalkyl mercaptans, which may be obtained according to the invention from epoxides of olefins or unsaturated alcohols, have not previously been described in the literature. The process according to the invention has therefore also made new chemical substances available.

Various modifications of the herein described novel compounds and the process for their preparation may be made without departing from the spirit of the scope thereof, and it is to be understood that the invention is to be limited only as defined by the appended claims.

We claim:

1. Process for the preparation of an hydroxy-mercaptan which consists essentially of reacting an alkene-vicinal epoxide having 8 to 24 carbon atoms with substantially the stoichiometric amount of hydrogen sulfide at a temperture of from 0° C. to 80° C. in the presence of 0.05% to 7% by weight, based on said epoxide, of diethylamine adding an inert polar solvent to the reaction mixture to facilitate the reaction between said epoxide and hydrogen sulfide, and recovering said hydroxy-mercaptan from the reaction mixture.

2. Process of claim 1 wherein amount of said solvent is between 50% and 150% by weight, based on said epoxide.

3. Process of claim 1 including the step of mixing said epoxide with said solvent prior to reacting said epoxide with hydrogen sulfide.

4. Process of claim 1 including the steps of mixing said amine with said solvent, and adding said epoxide while simultaneously continuously introducing hydrogen sulfide into the reaction mixture.

5. Process of claim 4 wherein hydrogen sulfide is added in an amount that the reaction mixture is capable of absorbing.

6. Process of claim 5 including the step of agitating the reaction mixture while adding hydrogen sulfide.

References Cited

Reid: "Chemistry of Bivalent Sulfur," vol I (1958), p. 378.

LEWIS GOTTS, Primary Examiner

D. R. PHILLIPS, Assistant Examiner

U.S. Cl. X.R.

260—609 D